(12) United States Patent
Lewis

(10) Patent No.: US 6,998,361 B2
(45) Date of Patent: Feb. 14, 2006

(54) HIGH TEMPERATURE GLASS FIBER INSULATION

(75) Inventor: Albert Lewis, Chino, CA (US)

(73) Assignee: Glass Incorporated, Chino, CA (US)

( * ) Notice: Subject to any disclaimer, the term of this patent is extended or adjusted under 35 U.S.C. 154(b) by 41 days.

(21) Appl. No.: 10/667,179

(22) Filed: Sep. 19, 2003

(65) Prior Publication Data

US 2004/0092379 A1    May 13, 2004

Related U.S. Application Data

(63) Continuation-in-part of application No. 10/090,346, filed on Mar. 4, 2002, now abandoned.

(51) Int. Cl.
  *C03C 13/06* (2006.01)
  *C03C 13/00* (2006.01)
  *C03C 3/087* (2006.01)

(52) U.S. Cl. .............................. 501/36; 501/35; 501/70

(58) Field of Classification Search ................. 501/27, 501/35, 36, 68–73
  See application file for complete search history.

(56) References Cited

U.S. PATENT DOCUMENTS

| | | | | |
|---|---|---|---|---|
| 3,854,986 A | * | 12/1974 | Chvalovsky et al. | 428/391 |
| 5,576,252 A | * | 11/1996 | Rapp et al. | 501/35 |
| 5,962,354 A | * | 10/1999 | Fyles et al. | 501/36 |
| 6,156,683 A | * | 12/2000 | Grove-Rasmussen et al. | 501/35 |

* cited by examiner

*Primary Examiner*—Karl Group
*Assistant Examiner*—Elizabeth A. Bolden
(74) *Attorney, Agent, or Firm*—Boniard I. Brown

(57) ABSTRACT

Improved glass compositions for glass fibers typically useful for fire resistant blankets or containers to provide high burn-through resistance at temperatures of 2,300° F. and typically comprising 10.23% to 81.81% silica, 2.0% to 26.00% alumina, 3.0% to 15.0% calcium oxide, 0% to 10.50% magnesium oxide, 1.0% to 18.0% ferrous+ferric oxide, and 0% to 4.0% titanium dioxide; the improved glass compositions may include 0% to 9% lithium oxide, 0% to 9% boron oxide, 0% to 6.0% manganese oxide, and 0% to 4.0% phosphorous oxide.

30 Claims, No Drawings

HIGH TEMPERATURE GLASS FIBER INSULATION

RELATED APPLICATIONS

This application is a continuation-in-part of U.S. patent application Ser. No. 10/090,346, filed Mar. 4, 2002, now abandoned.

BACKGROUND AND SUMMARY OF THE INVENTION

The present invention relates to glass compositions and particularly to glass compositions having good fiberizing characteristics, high strength, high durability at high temperatures, and high modulus of elasticity.

There has existed a demand for fiber glass compositions which can be successfully formed into fibers, particularly for use in insulation and acoustical products.

Problems of achieving those characteristics at relatively low cost have long been recognized in the glass art, but no satisfactory compositions have been available for forming long and small diameter glass fibers having the desired characteristics.

The problems associated with the achieving of such characteristics and providing an appropriate product at reasonable costs have long been recognized in the glass art.

High temperature glass compositions have heretofore been produced, but they are subject to the shortcomings of having a short working temperature range or being too expensive to produce due to the high costs of raw material and/or energy requirements.

Fibers for aircraft insulation are of particular importance, particularly for commercial aircraft. The Federal Aviation Administration has long dictated aircraft be made safer.

Aircraft have been destroyed and people's lives lost by fire, and crashes. Examples are an MD-11 which burned and was destroyed in Canada, and an MD-80 which was destroyed by fire and crashed in Texas, and many others. These crashes were blamed on insulation blankets which caught fire and burned. The blankets embodied fibers which were relatively low-temperature fibers and so melted at high temperatures.

An object of the invention is to provide a glass which has good insulation and acoustical properties, high strength, a high modulus of elasticity and high temperature resistance properties.

Another object is to provide a glass which has high strength and which can be drawn into long, strong glass fibers.

Substantial cost reductions are achieved because of the utilization of relatively inexpensive raw materials and lower energy use, which provide high temperature resistance, good insulation and acoustical properties and high strength.

Very little refining is required to provide freedom from impurities, thus allowing continuous or discontinuous fibers to be manufactured with relative ease.

The glass compositions of this invention can be formed into long and/or short, stable glass fibers.

DESCRIPTION OF THE PREFERRED EMBODIMENTS

The present invention relates to glass compositions and particularly to glass compositions having good fiberizing characteristics, high strength, high durability at high temperatures, and high modulus of elasticity.

In the course of research efforts and development work relative to the present invention, a wide range of fiber diameters were investigated, such range being from 0.5 to 5 microns. High temperature insulation values were obtained throughout such range.

High temperature insulation values were obtained throughout the range of, and independent of, fiber diameters.

The glass specimens were prepared utilizing a specific raw material which included silica, alumina, titania, zirconia and other oxides.

Glasses of this invention were prepared by melting raw batch material in the following approximate ranges of temperatures: between about 2,600° F. to about 2,900° F., utilizing conventional refractory containers.

Glass compositions according to the invention have a liquidous temperature of approximately 2,400° F., which is suitable for glass forming.

The glass can be formed into fibers for insulation and acoustical parts using the centrifugal rotary process (vertical and horizontal), or blowing and flame processes. It can also be drawn into continuous and staple fibers.

The material of the invention differs from other high temperature glasses in that, the fibers of the invention differ from prior art in that the material of the invention has good resistance to devitrification at the forming temperature, and requires lower processing energy than other high temperature fibers.

The molten glass may also be formed into fibers on a conventional drawing wheel, at speeds up to 12,000 feet per minute at temperatures between 2,400° F. to about 2,900° F. Speeds between about 3,000 to about 10,000 feet per minute are preferable in order to provide optimum filament properties. Fibers may be drawn from about 9 microns to about 14 microns in diameter. Diameters of about 9 microns are preferred. Fibers were produced using the centrifugal, blowing and flame processes.

In this research work, resultant fibers were collected on a metal conveyor, and maintained thereon during the rest of the manufacture process.

Compositions according to the present invention provide a reduction of cost of approximately 20% when compared to other high temperature fibers, because of the use of less expensive raw materials, and lower energy requirements in processing them into glass fibers. In addition, it has been determined that less binder is required than in known, commercially available compositions due to the improved surface condition and high strength of the fibers.

Insulation fiber diameters may range from about 0.5 to 5 microns. All of the above processes may be utilized to manufacture glass fibers in the above noted diameter range.

In the course of development research, it has been postulated that the results obtained are provided by the amorphous glass fibers being converted during the burn-through tests into a ceram glass which forms a fiber mat in which the fiber integrity is maintained, thus preventing high temperatures from penetrating the insulation blanket containing the fibers.

A batch blend forms fibers which are heat and fire resistant, temperatures as high as 2,200° F. being withstood, as in aircraft insulation blankets, for several hours.

The following typical batch blends were mixed and melted in a refractory furnace and the resultant glasses were successfully fiberized into continuous glass fibers:

TYPICAL BATCH BLENDS

| Raw Materials | Batch Weights | | |
|---|---|---|---|
| Silica Sand | 243.86 | 249.33 | 251.35 |
| Iron Oxide | 35.75 | 26.15 | 22.31 |
| Kaolin | 94.92 | 97.15 | 98.09 |
| Soda Ash | 8.47 | 8.68 | 8.72 |
| Dolomite Limestone | 44.84 | 44.03 | 46.68 |
| Titanium Dioxide | 3.65 | 3.73 | 3.75 |
| Manganese Oxide | 0.90 | 1.0 | 1.25 |

Fibers according to the present invention, for insulation blankets, may have the following components having the following ranges of percentages:

COMPOSITIONAL RANGE

| Oxides | Oxide Weight % |
|---|---|
| $SiO_2$ | 10.23 to 81.81 |
| $Al_2O_3$ | 2.0 to 26.0 |
| $Na_2O$ | 0 to 5.80 |
| $K_2O$ | 0 to 11.0 |
| CaO | 3.0 to 10.5 |
| MgO | 0 to 10.5 |
| $Fe_2O_3$ + FeO | 1.0 to 18.0 |
| $TiO_2$ | 0 to 4.0 |
| $ZrO_2$ | 0 to 5.0 |
| MnO | 0 to 6.0 |

Set forth below are illustrative examples of embodiments of the present invention.

EXAMPLE 1

| Oxides | Weight Percent |
|---|---|
| $SiO_2$ | 46.23 |
| $Al_2O_3$ | 25.91 |
| $Na_2O$ | 2.40 |
| $K_2O$ | 0.82 |
| CaO | 8.27 |
| MgO | 4.06 |
| $Fe_2O_3$ + FeO | 10.22 |
| $TiO_2$ | 1.58 |
| $ZrO_2$ | 0.01 |
| $P_2O_5$ | 0.28 |
| MnO | 0.23 |

EXAMPLE 2

| Oxides | Weight Percent |
|---|---|
| $SiO_2$ | 58.12 |
| $Al_2O_3$ | 11.15 |
| $Na_2O$ | 2.24 |
| $K_2O$ | 0.76 |
| CaO | 7.71 |
| MgO | 3.78 |
| $Fe_2O_3$ + FeO | 9.52 |
| $TiO_2$ | 1.48 |
| $ZrO_2$ | 4.77 |
| $P_2O_5$ | 0.26 |
| MnO | 0.22 |

EXAMPLE 3

| Oxides | Weight Percent |
|---|---|
| $SiO_2$ | 62.95 |
| $Al_2O_3$ | 11.13 |
| $Na_2O$ | 2.24 |
| $K_2O$ | 0.76 |
| CaO | 7.70 |
| MgO | 3.77 |
| $Fe_2O_3$ + FeO | 9.51 |
| $TiO_2$ | 1.47 |
| $ZrO_2$ | 0.01 |
| $P_2O_5$ | 0.26 |
| MnO | 0.22 |

EXAMPLE 4

| Oxides | Weight Percent |
|---|---|
| $SiO_2$ | 53.69 |
| $Al_2O_3$ | 13.84 |
| $Na_2O$ | 2.79 |
| $K_2O$ | 0.95 |
| CaO | 9.61 |
| MgO | 4.71 |
| $Fe_2O_3$ + FeO | 11.87 |
| $TiO_2$ | 1.83 |
| $ZrO_2$ | 0.00 |
| $P_2O_5$ | 0.38 |
| MnO | 0.33 |

EXAMPLE 5

| Oxides | Weight Percent |
|---|---|
| $SiO_2$ | 55.25 |
| $Al_2O_3$ | 18.25 |
| $Na_2O$ | 2.30 |
| $K_2O$ | 1.80 |
| CaO | 8.38 |
| MgO | 3.97 |
| $Fe_2O_3$ + FeO | 8.50 |
| $TiO_2$ | 1.09 |
| $ZrO_2$ | 0.31 |
| $P_2O_5$ | 0.20 |
| MnO | 0.18 |

EXAMPLE 6

| Oxides | Weight Percent |
|---|---|
| $SiO_2$ | 67.55 |
| $Al_2O_3$ | 9.76 |
| $Na_2O$ | 1.96 |
| $K_2O$ | 0.67 |
| CaO | 6.74 |
| MgO | 3.30 |
| $Fe_2O_3$ + FeO | 8.32 |
| $TiO_2$ | 1.28 |
| $ZrO_2$ | 0.01 |
| $P_2O_5$ | 0.22 |
| MnO | 0.19 |

EXAMPLE 7

| Oxides | Weight Percent |
|---|---|
| $SiO_2$ | 70.02 |
| $Al_2O_3$ | 10.14 |
| $Na_2O$ | 2.03 |
| $K_2O$ | 0.01 |
| CaO | 6.53 |
| MgO | 4.26 |
| $Fe_2O_3$ + FeO | 5.26 |
| $TiO_2$ | 1.33 |
| $ZrO_2$ | 0 |
| $P_2O_5$ | 0 |
| MnO | 0 |

Set forth below is a table of compositions of oxides of the instant invention.

TABLE I

| Oxides | Range 1 wt % | Range 2 wt % | Example 1 wt % | Example 8 wt % | Example 9 wt % | Example 10 wt % | Example 11 wt % | Example 4 wt % | Example 5 wt % |
|---|---|---|---|---|---|---|---|---|---|
| $SiO_2$ | 46.0–71.0 | 46.0–71.0 | 46.23 | 46.23 | 61.03 | 64.95 | 64.95 | 53.69 | 55.25 |
| $Al_2O_3$ | 9.0–12.5 | 9.0–12.5 | 25.91 | 25.91 | 11.71 | 11.13 | 11.13 | 13.84 | 18.25 |
| $Na_2O$ | 0–2.00 | | 2.40 | 2.40 | 2.35 | 2.24 | 2.24 | 2.79 | 2.30 |
| $K_2O$ | 0–2.00 | | 0.82 | 0.82 | 0.80 | 2.24 | 2.24 | 0.95 | 1.80 |
| CaO | 3.76–10.5 | 1.76–10.5 | 8.27 | 8.27 | 8.10 | 3.76 | 3.76 | 9.61 | 8.38 |
| MgO | 1.84–10.5 | 1.84–10.5 | 4.06 | 4.06 | 3.97 | 3.77 | 3.77 | 4.71 | 3.97 |
| $Fe_2O_3$ + FeO | 4.64–15.5 | 4.64–15.5 | 10.22 | 10.22 | 9.99 | 9.51 | 9.51 | 11.87 | 8.50 |
| $TiO_2$ | 0.72–3.0 | 0.72–3.0 | 1.58 | 1.58 | 1.55 | 1.47 | 1.47 | 1.83 | 1.09 |
| $ZrO_2$ | | | 0.01 | | 0 | 0.01 | | 0 | 0.31 |
| $P_2O_5$ | | | 0.28 | 0.28 | 0.27 | 0.70 | 0.70 | .38 | 0.20 |
| MnO | | | 0.23 | 0.23 | 0.23 | 0.22 | 0.22 | 0.33 | 0.18 |

| Oxides | Example 6 wt % | Example 12 wt % | Example 7 wt % | Example 13 wt % | Example 14 wt % | Example 15 wt % | Example 16 wt % | Example 17 wt % | Example 18 wt % |
|---|---|---|---|---|---|---|---|---|---|
| $SiO_2$ | 67.55 | 67.55 | 70.02 | 46.47 | 66.92 | 55.50 | 67.83 | 70.31 | 46.47 |
| $Al_2O_3$ | 9.76 | 9.76 | 10.14 | 25.91 | 11.42 | 18.33 | 9.80 | 10.18 | 25.91 |
| $Na_2O$ | 1.96 | 1.96 | 2.03 | 2.41 | 2.59 | 2.31 | 1.97 | 2.03 | 2.41 |
| $K_2O$ | 0.67 | 0.67 | 0.01 | 0.95 | 2.59 | 1.81 | 0.67 | 0.01 | 0.95 |
| CaO | 6.74 | 6.74 | 6.53 | 8.31 | 3.81 | 8.42 | 6.77 | 6.55 | 8.31 |
| MgO | 3.30 | 3.30 | 4.26 | 4.08 | 4.01 | 3.99 | 3.31 | 4.27 | 4.08 |
| $Fe_2O_3$ + FeO | 8.32 | 8.32 | 5.26 | 10.27 | 8.66 | 8.54 | 8.36 | 5.28 | 10.27 |
| $TiO_2$ | 1.28 | 1.28 | 1.33 | 1.60 | 0.72 | 1.10 | 1.29 | 1.37 | |
| $ZrO_2$ | 0.01 | | 0 | | | | | | |
| $P_2O_5$ | 0.22 | 0.22 | 0 | | | | | | |
| MnO | 0.19 | 0.19 | 0 | | | | | | |

| Oxides | Example 19 wt % | Example 20 wt % |
|---|---|---|
| $SiO_2$ | 66.92 | 70.31 |
| $Al_2O_3$ | 11.42 | 10.18 |
| $Na_2O$ | 2.59 | 2.03 |
| $K_2O$ | 2.59 | 0.01 |
| CaO | 3.81 | 6.55 |
| MgO | 4.01 | 4.27 |
| $Fe_2O_3$ + FeO | 8.66 | 5.28 |
| $TiO_2$ | | |
| $ZrO_2$ | | |
| $P_2O_5$ | | |
| MnO | | |

Research and testing after the filing of Applicant's original application have determined that glass fibers wherein substitution for deleted respective oxides in certain glass fiber compositions defined in the original application, provide improved properties and excellent results. Glass fibers were utilized wherein certain deletions of respective oxides were detected and/or new oxides were added to enhance glass fiber properties, such as enhanced moisture resistance, acoustical properties, and strength. It was determined that these oxides may be substituted for or used in combination with certain oxides specified in Applicant's parent application. These newly-utilized oxides include lithium oxide ($Li_2O$) and boron oxide ($B_2O_3$).

It was determined that calcium oxide, sodium oxide, potassium oxide, and magnesium oxide mau be relaced or utilized in conjunction with either $Li_2O$ or $B_2O_3$, and that iron should preferably be present in the form of $Fe_2O_3$+FeO, and that the glass fibers should be essentially free of $Na_2O$, $K_2O$, and $ZrO_2$.

Minor oxides identified in the claims are in small amounts normally resulting from impurities in raw materials, and do not affect desired properties.

Particular respective compositions within the above compositional range are defined in the accompanying claims.

In addition to the foregoing, the research and testing further demonstrated that other less expensive raw materials may be substituted or utilized in conjunction with originally disclosed raw materials. These raw materials include boric acid, borax, basalt, cullet, dolime, lithium carbonate, and colemanite.

Set forth below are typical batch blends that were mixed and melted in a refractory furnace, the resultant glasses being successfully fiberized into continuous insulation glass fibers.

TYPICAL BATCH BLENDS

| | Batch Weights | | | | | | |
|---|---|---|---|---|---|---|---|
| Raw Materials | Batch No. 1 | Batch No. 2 | Batch No. 3 | Batch No. 4 | Batch No. 5 | Batch No. 6 | Batch No. 7 |
| Silica Sand | 246.72 | 203.99 | 174.00 | 176.64 | 135.39 | 200.18 | 211.92 |
| Iron Oxide | 30.56 | 5.34 | 36.76 | 37.94 | 24.62 | 36.57 | 31.12 |
| Alumina Hydrate | 35.24 | ... | 81.96 | 83.56 | ... | ... | ... |
| Kaolin | ... | 62.66 | ... | ... | 73.48 | 108.67 | 95.40 |
| Colemanite | ... | ... | ... | 21.32 | ... | ... | ... |
| Boric Acid | ... | ... | 14.84 | ... | ... | ... | ... |
| Borax | ... | 3.74 | ... | ... | ... | ... | ... |
| Soda Ash | 10.92 | ... | 4.84 | 5.08 | ... | ... | 3.56 |
| Potash | 3.68 | ... | ... | ... | ... | ... | ... |
| Lithium Carbonate | ... | ... | ... | ... | ... | ... | 17.04 |
| Dolomite Limestone | 72.88 | ... | 87.64 | 75.92 | ... | ... | ... |
| Dolime | ... | 26.20 | ... | ... | 25.68 | 38.17 | 40.96 |
| Titanium Dioxide | ... | 2.08 | ... | ... | ... | 3.77 | ... |
| Basalt | ... | 150.00 | ... | ... | 150.00 | ... | ... |
| Cullet | ... | ... | ... | ... | 44.83 | 66.63 | ... |

In the research and testing, burn-through tests were conducted utilizing Federal Aviation Authority prescribed burn-through test equipment. Blankets comprising fibers according to the present invention prevented burn-through for periods of several hours, typically 7 hours or more and up to 12 hours in some instances. Batch burn-through temperatures up to about 2,300° were maintained and achieved for extended periods of time.

In the research and testing, fiber insulation blankets were utilized which were fabricated of fibers manufactured in the following compositional ranges:

COMPOSITIONAL RANGE

| Oxides | Oxide Weight % |
|---|---|
| $SiO_2$ | 49 to 76 |
| $Al_2O_3$ | 2 to 26 |
| $B_2O_3$ | 0 to 9 |
| $Li_2O$ | 0 to 9 |
| $Na_2O$ | 0 to 13 |
| $K_2O$ | 0 to 6 |
| CaO | 3 to 15 |
| MgO | 0 to 15 |
| $Fe_2O_3$ + FeO | 1 to 18 |
| $TiO_2$ | 0 to 4 |
| $P_2O_5$ | 0 to 4 |

Set forth below are illustrative examples of the later added embodiments of the invention.

EXAMPLE 21

| Oxides | Weight Percent |
|---|---|
| $SiO_2$ | 67.55 |
| $Al_2O_3$ | 9.76 |
| $Na_2O$ | 0.67 |
| $K_2O$ | 1.96 |
| CaO | 6.74 |
| MgO | 3.30 |
| $Fe_2O_3$ + FeO | 8.32 |
| $TiO_2$ | 1.28 |
| $ZrO_2$ | 0.01 |
| $P_2O_5$ | 0.22 |
| MnO | 0.19 |

EXAMPLE 22

| Oxides | Weight Percent |
|---|---|
| $SiO_2$ | 68.00 |
| $Al_2O_3$ | 9.06 |
| $B_2O_3$ | 2.01 |
| $Na_2O$ | 2.33 |
| $K_2O$ | 0.42 |
| CaO | 6.23 |
| MgO | 3.06 |
| $Fe_2O_3$ + FeO | 7.70 |
| $TiO_2$ | 1.19 |

EXAMPLE 23

| Oxides | Weight Percent |
|---|---|
| $SiO_2$ | 67.36 |
| $Al_2O_3$ | 9.76 |
| $Li_2O$ | 2.86 |
| $Na_2O$ | 1.00 |
| CaO | 5.28 |
| MgO | 3.80 |
| $Fe_2O_3$ + FeO | 8.46 |
| $TiO_2$ | 1.48 |

EXAMPLE 24

| Oxides | Weight Percent |
|---|---|
| $SiO_2$ | 65.24 |
| $Al_2O_3$ | 2.50 |
| $Na_2O$ | 13.00 |
| $B_2O_3$ | 6.00 |
| CaO | 6.70 |
| MgO | 1.85 |
| $Fe_2O_3$ + FeO | 4.01 |
| $TiO_2$ | 0.70 |

EXAMPLE 25

| Oxides | Weight Percent |
|---|---|
| $SiO_2$ | 68.00 |
| $Al_2O_3$ | 2.50 |
| $Na_2O$ | 13.00 |
| $B_2O_3$ | 6.00 |
| CaO | 6.70 |
| MgO | 2.71 |
| $Fe_2O_3$ + FeO | 1.00 |
| $TiO_2$ | 1.09 |

Set forth below is a table of compositions of oxides of the instant invention.

TABLE II

| Oxides | Range 3 wt % | Range 4 wt % | Example 26 wt % | Example 21 wt % | Example 27 wt % | Example 23 wt % | Example 28 wt % | Example 29 wt % | Example 30 wt % |
|---|---|---|---|---|---|---|---|---|---|
| $SiO_2$ | 49.0–76.0 | 67.55 | 67.55 | 67.55 | 49.0 | 67.36 | 65.16 | 56.01 | 66.51 |
| $Al_2O_3$ | 2.0–12.5 | 9.76 | 9.76 | 9.76 | 23.0 | 9.76 | 11.18 | 13.92 | 9.34 |
| $Na_2O$ | 0–12.0 | 0.67 | 0.67 | 0.67 | 1.04 | 1.00 | | 2.92 | 2.81 |
| $K_2O$ | 0–2.0 | | | 1.96 | | | | 0.96 | |
| CaO | 3.0–15.0 | 6.74 | 6.74 | 6.74 | 8.31 | 5.28 | 7.14 | 8.40 | 6.41 |
| MgO | 2.0–15.0 | 3.30 | 3.30 | 3.30 | 4.08 | 3.80 | 3.99 | | 2.99 |
| $Fe_2O_3$ + FeO | 1.0–18.0 | 8.32 | 8.32 | 8.32 | 10.27 | 8.46 | 8.95 | 11.94 | 8.53 |
| $TiO_2$ | 0–4.0 | 1.28 | 1.28 | 1.28 | 1.59 | 1.48 | 0.57 | 1.84 | |
| $ZrO_2$ | | 0.01 | 0.01 | 0.01 | | | | | |
| $P_2O_5$ | 0–4.0 | 0.22 | 0.22 | 0.22 | | | | | |
| MnO | | 0.19 | 0.19 | 0.19 | | | | | |
| $B_2O_3$ | 0–9 | 1.96 | | | 2.35 | | 3.01 | 4.01 | |
| $Li_2O$ | 0–9 | | 1.96 | | | 2.86 | | | 3.41 |

| Oxides | Example 22 wt % | Example 24 wt % | Example 31 wt % | Example 32 wt % | Example 33 wt % | Example 34 wt % |
|---|---|---|---|---|---|---|
| $SiO_2$ | 68.00 | 65.24 | 67.50 | 46.47 | 66.92 | 70.31 |
| $Al_2O_3$ | 9.06 | 2.50 | 9.34 | 25.91 | 11.42 | 8.30 |
| $Na_2O$ | 2.33 | 13.00 | | 2.55 | 2.59 | 2.03 |
| $K_2O$ | 0.42 | | 0.81 | | | |
| CaO | 6.23 | 6.70 | 8.41 | 8.31 | 4.02 | 6.55 |
| MgO | 3.06 | 1.85 | 2.00 | 4.08 | 0.81 | 3.27 |
| $Fe_2O_3$ + FeO | 7.70 | 4.01 | 8.53 | 10.27 | 10.00 | 8.53 |
| $TiO_2$ | 1.19 | 0.70 | 1.10 | | | |
| $ZrO_2$ | | | | | | |
| $P_2O_5$ | | | | | | |
| MnO | | | | | | |
| $B_2O_3$ | 2.01 | 6.00 | | 2.41 | 4.24 | 1.01 |
| $Li_2O$ | | | 2.31 | | | |

It will be understood that various changes and modifications may be made from the preferred embodiments discussed above without departing from the scope of the present invention, which is established by the following claims and equivalents thereof.

What is claimed is:

1. A glass composition for forming glass fibers of high heat resistance, comprising:
   $SiO_2$ in an amount of about 46.23 weight percent,
   $Al_2O_3$ in an amount of about 25.91 weight percent,
   $Na_2O$ in an amount of about 2.40 weight percent,
   $K_2O$ in an amount of about 0.82 weight percent,
   CaO in an amount of about 8.27 weight percent,
   MgO in an amount of about 4.06 weight percent,
   $Fe_2O_3$+FeO in an amount of about 10.22 weight percent,
   $TiO_2$ in an amount of about 1.58 weight percent,
   $ZrO_2$ in an amount of about 0.01 weight percent,
   $P_2O_5$ in an amount of about 0.28 weight percent, and
   MnO in an amount of about 0.23 weight percent.

2. A glass composition according to claim 1, wherein the resulting composition is essentially free of $ZrO_2$.

3. A glass composition for forming glass fibers of high heat resistance, comprising:
   $SiO_2$ in an amount of about 64.95 weight percent,
   $Al_2O_3$ in an amount of about 11.13 weight percent,
   $Na_2O$ in an amount of about 2.24 weight percent,
   $K_2O$ in an amount of about 2.24 weight percent,
   CaO in an amount of about 3.76 weight percent,
   MgO in an amount of about 3.77 weight percent,
   $Fe_2O_3$+FeO in an amount of about 9.51 weight percent,
   $TiO_2$ in an amount of about 1.47 weight percent
   $ZrO_2$ in an amount of about 0.01 weight percent,
   $P_2O_5$ in an amount of about 0.70 weight percent, and
   MnO in an amount of about 0.22 weight percent.

4. A glass composition according to claim 3, wherein the resulting composition is essentially free of $ZrO_2$.

5. A glass composition for forming glass fibers of high heat resistance, comprising:
   $SiO_2$ in an amount of about 55.25 weight percent,
   $Al_2O_3$ in an amount of about 18.25 weight percent,
   $Na_2O$ in an amount of about 2.30 weight percent,
   $K_2O$ in an amount of about 1.80 weight percent,
   CaO in an amount of about 8.38 weight percent,
   MgO in an amount of about 3.97 weight percent,
   $Fe_2O_3$+FeO in an amount of about 8.50 weight percent,
   $TiO_2$ in an amount of about 1.09 weight percent,
   $ZrO_2$ in an amount of about 0.31 weight percent,
   $P_2O_5$ in an amount of about 0.20 weight percent, and
   MnO in an amount of about 0.18 weight percent.

6. A glass composition for forming glass fibers of high heat resistance, comprising:
   $SiO_2$ in an amount of about 67.55 weight percent,
   $Al_2O_3$ in an amount of about 9.76 weight percent,
   $Na_2O$ in an amount of about 1.96 weight percent,
   $K_2O$ in an amount of about 0.67 weight percent,
   GaO in an amount of about 6.74 weight percent,
   MgO in an amount of about 3.30 weight percent,
   $Fe_2O_3$+FeO in an amount of about 8.32 weight percent,
   $TiO_2$ in an amount of about 1.28 weight percent,
   $ZrO_2$ in an amount of about 0.01 weight percent,
   $P_2O_5$ in an amount of about 0.22 weight percent, and
   MnO in an amount of about 0.19 weight percent.

7. A glass composition according to claim 6, wherein the resulting composition is essentially free of $ZrO_2$.

8. A glass composition for forming glass fibers of high heat resistance, comprising:
   $SiO_2$ in an amount of about 70.02 weight percent,
   $Al_2O_3$ in an amount of about 10.14 weight percent,
   $Na_2O$ in an amount of about 2.03 weight percent,
   $K_2O$ in an amount of about 0.01 weight percent,
   CaO in an amount of about 6.53 weight percent,
   MgO in an amount of about 4.26 weight percent,
   $Fe_2O_3$+FeO in an amount of about 5.26 weight percent,
   $TiO_2$ in an amount of about 1.33 weight percent,
   $ZrO_2$ in an amount of about 0 weight percent,
   $P_2O_5$ in an amount of about 0 weight percent, and
   MnO in an amount of about 0 weight percent.

9. A glass composition for forming glass fibers of high heat resistance, comprising:
   $SiO_2$ in an amount of about 46.47 weight percent,
   $Al_2O_3$ in an amount of about 25.91 weight percent,
   $Na_2O$ in an amount of about 2.41 weight percent,
   $K_2O$ in an amount of about 0.95 weight percent,
   CaO in an amount of about 8.31 weight percent,
   MgO in an amount of about 4.08 weight percent,
   $Fe_2O_3$+FeO in an amount of about 10.27 weight percent, and
   $TiO_2$ in an amount of about 1.60 weight percent.

10. A glass composition for forming glass fibers of high heat resistance, comprising:
    $SiO_2$ in an amount of about 66.92 weight percent,
    $Al_2O_3$ in an amount of about 11.42 weight percent,
    $Na_2O$ in an amount of about 2.59 weight percent,
    $K_2O$ in an amount of about 2.59 weight percent,
    CaO in an amount of about 3.81 weight percent,
    MgO in an amount of about 4.01 weight percent,
    $Fe_2O_3$+FeO in an amount of about 8.66 weight percent, and
    $TiO_2$ in an amount of about 0.72 weight percent.

11. A glass composition for forming glass fibers of high heat resistance, comprising:
    $SiO_2$ in an amount of about 55.50 weight percent,
    $Al_2O_3$ in an amount of about 18.33 weight percent,
    $Na_2O$ in an amount of about 2.31 weight percent,
    $K_2O$ in an amount of about 1.81 weight percent,
    CaO in an amount of about 8.42 weight percent,
    MgO in an amount of about 3.99 weight percent,
    $Fe_2O_3$+FeO in an amount of about 8.54 weight percent, and
    $TiO_2$ in an amount of about 1.10 weight percent.

12. A glass composition for forming glass fibers of high heat resistance, comprising:
    $SiO_2$ in an amount of about 67.83 weight percent,
    $Al_2O_3$ in an amount of about 9.80 weight percent,
    $Na_2O$ in an amount of about 1.97 weight percent,
    $K_2O$ in an amount of about 0.67 weight percent,
    CaO in an amount of about 6.77 weight percent,
    MgO in an amount of about 3.31 weight percent,
    $Fe_2O_3$+FeO in an amount of about 8.36 weight percent, and
    $TiO_2$ in an amount of about 1.29 weight percent.

13. A glass composition for forming glass fibers of high heat resistance, comprising:
    $SiO_2$ in an amount of about 70.31 weight percent,
    $Al_2O_3$ in an amount of about 10.18 weight percent,
    $Na_2O$ in an amount of about 2.03 weight percent,
    $K_2O$ in an amount of about 0.01 weight percent,
    CaO in an amount of about 6.55 weight percent,
    MgO in an amount of about 4.27 weight percent,
    $Fe_2O_3$+FeO in an amount of about 5.28 weight percent, and
    $TiO_2$ in an amount of about 1.37 weight percent.

14. A glass fiber comprising the glass composition of claim 9 wherein the glass fiber is resistant to heat and fire for a substantial period of at least three hours to prevent burn-through by the conversion of at least a portion of the fibers into a fiber mat of ceram glass.

15. A glass fiber comprising the glass composition of claim 10 wherein the glass fiber is resistant to heat and fire for a substantial period of at least three hours to prevent burn-through by the conversion of at least a portion of the fibers into a fiber mat of ceram glass.

16. A glass fiber comprising the glass composition of claim 13 wherein the glass fiber is resistant to heat and fire for a substantial period of at least three hours to prevent burn-through by the conversion of at least a portion of the fibers into a fiber mat of ceram glass.

17. A glass composition for forming glass fibers of high heat resistance, comprising:
   $SiO_2$ in an amount of about 67.55 weight percent,
   $Al_2O_3$ in an amount of about 9.76 weight percent,
   $Na_2O$ in an amount of about 0.67 weight percent,
   $B_2O_3$ in an amount of about 1.96 weight percent,
   CaO in an amount of about 6.74 weight percent,
   MgO in an amount of about 3.30 weight percent,
   $Fe_2O_3$+FeO in an amount of about 8.32 weight percent,
   $TiO_2$ in an amount of about 1.28 weight percent,
   $ZrO_2$ in an amount of about 0.01 weight percent,
   $P_2O_5$ in an amount of about 0.22 weight percent, and
   NnO in an amount of about 0.19 weight percent.

18. A glass composition for forming glass fibers of high heat resistance, comprising:
   $SiO_2$ in an amount of about 67.55 weight percent,
   $Al_2O_3$ in an amount of about 9.76 weight percent,
   $Na_2O$ in an amount of about 0.67 weight percent,
   $Li_2O$ in an amount of about 1.96 weight percent,
   CaO in an amount of about 6.74 weight percent,
   MgO in an amount of about 3.30 weight percent,
   $Fe_2O_3$+FeO in an amount of about 8.32 weight percent,
   $TiO_2$ in an amount of about 1.28 weight percent,
   $ZrO_2$ in an amount of about 0.01 weight percent,
   $P_2O_5$ in an amount of about 0.22 weight percent, and
   MnO in an amount of about 0.19 weight percent.

19. A glass composition for forming glass fibers of high heat resistance, comprising:
   $SiO_2$ in an amount of about 67.55 weight percent,
   $Al_2O_3$ in an amount of about 9.76 weight percent,
   $Na_2O$ in an amount of about 0.67 weight percent,
   $K_2O$ in an amount of about 1.96 weight percent,
   CaO in an amount of about 6.74 weight percent,
   MgO in an amount of about 3.30 weight percent,
   $Fe_2O_3$+FeO in an amount of about 8.32 weight percent,
   $TiO_2$ in an amount of about 1.28 weight percent,
   $ZrO_2$ in an amount of about 0.01 weight percent,
   $P_2O_5$ in an amount of about 0.22 weight percent, and
   MnO in an amount of about 0.19 weight percent.

20. A glass composition for forming glass fibers of high heat resistance, comprising:
   $SiO_2$ in an amount of about 49.0 weight percent,
   $Al_2O_3$ in an amount of about 23.0 weight percent,
   $B_2O_3$ in an amount of about 2.35 weight percent,
   $Na_2O$ in an amount of about 1.04 weight percent,
   CaO in an amount of about 8.31 weight percent,
   MgO in an amount of about 4.08 weight percent,
   $Fe_2O_3$+FeO in an amount of about 10.27 weight percent, and
   $TiO_2$ in an amount of about 1.59 weight percent.

21. A glass composition for forming glass fibers of high heat resistance, comprising:
   $SiO_2$ in an amount of about 67.36 weight percent,
   $Al_2O_3$ in an amount of about 9.76 weight percent,
   $Li_2O$ in an amount of about 2.86 weight percent,
   $Na_2O$ in an amount of about 1.00 weight percent,
   CaO in an amount of about 5.28 weight percent,
   MgO in an amount of about 3.80 weight percent,
   $Fe_2O_3$+FeO in an amount of about 8.46 weight percent, and
   $TiO_2$ in an amount of about 1.48 weight percent.

22. A glass composition for forming glass fibers of high heat resistance, comprising:
   $SiO_2$ in an amount of about 65.16 weight percent,
   $Al_2O_3$ in an amount of about 11.18 weight percent,
   $B_2O_3$ in an amount of about 3.01 weight percent,
   CaO in an amount of about 7.14 weight percent,
   MgO in an amount of about 3.99 weight percent,
   $Fe_2O_3$+FeO in an amount of about 8.95 weight percent, and
   $TiO_2$ in an amount of about 0.57 weight percent.

23. A glass composition for forming glass fibers of high heat resistance, comprising:
   $SiO_2$ in an amount of about 56.01 weight percent,
   $Al_2O_3$ in an amount of about 13.92 weight percent,
   $B_2O_3$ in an amount of about 4.01 weight percent,
   $Na_2O$ in an amount of about 2.92 weight percent,
   $K_2O$ in an amount of about 0.96 weight percent,
   CaO in an amount of about 8.40 weight percent,
   $Fe_2O_3$+FeO in an amount of about 11.94 weight percent, and
   $TiO_2$ in an amount of about 1.84 weight percent.

24. A glass composition for forming glass fibers of high heat resistance, comprising:
   $SiO_2$ in an amount of about 66.51 weight percent,
   $Al_2O_3$ in an amount of about 9.34 weight percent,
   $Li_2O$ in an amount of about 3.41 weight percent,
   $Na_2O$ in an amount of about 2.81 weight percent,
   CaO in an amount of about 6.41 weight percent,
   MgO in an amount of about 2.99 weight percent, and
   $Fe_2O_3$+FeO in an amount of about 8.53 weight percent.

25. A glass composition for forming glass fibers of high heat resistance, comprising:
   $SiO_2$ in an amount of about 68.00 weight percent,
   $Al_2O_3$ in an amount of about 9.06 weight percent,
   $B_2O_3$ in an amount of about 2.01 weight percent,
   $Na_2O$ in an amount of about 2.33 weight percent,
   $K_2O$ in an amount of about 0.42 weight percent,
   CaO in an amount of about 6.23 weight percent,
   MgO in an amount of about 3.06 weight percent,
   $Fe_2O_3$+FeO in an amount of about 7.70 weight percent, and
   $TiO_2$ in an amount of about 1.19 weight percent.

26. A glass composition for forming glass fibers of high heat resistance, comprising:
   $SiO_2$ in an amount of about 65.24 weight percent,
   $Al_2O_3$ in an amount of about 2.50 weight percent,
   $B_2O_3$ in an amount of about 6.00 weight percent,
   $Na_2O$ in an amount of about 13.00 weight percent,
   CaO in an amount of about 6.70 weight percent,
   MgO in an amount of about 1.85 weight percent,
   $Fe_2O_3$+FeO in an amount of about 4.01 weight percent, and
   $TiO_2$ in an amount of about 0.70 weight percent.

27. A glass composition for forming glass fibers of high heat resistance, comprising:
   $SiO_2$ in an amount of about 67.50 weight percent,
   $Al_2O_3$ in an amount of about 9.34 weight percent,
   $Li_2O$ in art amount of about 2.31 weight percent, K$_2$O in an amount of about 0.81 weight percent,
CaO in an amount of about 8.41 weight percent,
MgO in an amount of about 2.00 weight percent,
Fe$_2$O$_3$+FeO in an amount of about 8.53 weight percent and
TiO$_2$ in an amount of about 1.10 weight percent.

28. A glass composition for forming glass fibers of high heat resistance, comprising:
SiO$_2$ in an amount of about 46.47 weight percent,
Al$_2$O$_3$ in an amount of about 25.91 weight percent,
B$_2$O$_3$ in an amount of about 2.41 weight percent,
Na$_2$O in an amount of about 2.55 weight percent,
CaO in an amount of about 8.31 weight percent,
MgO in an amount of about 4.08 weight percent, and
Fe$_2$O$_3$+FeO in an amount of about 10.27 weight percent.

29. A glass composition for forming glass fibers of high heat resistance, comprising:
SiO$_2$ in an amount of about 66.92 weight percent,
Al$_2$O$_3$ in an amount of about 11.42 weight percent,
Na$_2$O in an amount of about 2.59 weight percent,
B$_2$O$_3$ in an amount of about 4.24 weight percent,
CaO in an amount of about 4.02 weight percent,
MgO in an amount of about 0.81 weight percent, and
Fe$_2$O$_3$+FeO in an amount of about 10.00 weight percent.

30. A glass composition for forming glass fibers of high heat resistance, comprising:
SiO$_2$ in an amount of about 70.31 weight percent,
Al$_2$O$_3$ in an amount of about 8.30 weight percent,
Na$_2$O in an amount of about 2.03 weight percent,
B$_2$O$_3$ in an amount of about 1.01 weight percent,
CaO In an amount of about 6.55 weight percent,
MgO in an amount of about 3.27 weight percent, and
Fe$_2$O$_3$+FeO in an amount of about 8.53 weight percent.

* * * * *